(12) United States Patent
Gresset et al.

(10) Patent No.: US 11,382,276 B2
(45) Date of Patent: Jul. 12, 2022

(54) METHOD FOR OPERATING AN AGRICULTURAL ROUNDBALER EJECTION FLAP

(71) Applicant: DEERE & COMPANY, Moline, IL (US)

(72) Inventors: Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 654 days.

(21) Appl. No.: 16/373,695

(22) Filed: Apr. 3, 2019

(65) Prior Publication Data
US 2019/0327901 A1   Oct. 31, 2019

(30) Foreign Application Priority Data

Apr. 26, 2018   (DE) .......................... 102018206518.7

(51) Int. Cl.
| | | |
|---|---|---|
| *A01F 15/08* | (2006.01) | |
| *F15B 21/08* | (2006.01) | |
| *F15B 19/00* | (2006.01) | |

(52) U.S. Cl.
CPC ........ *A01F 15/0883* (2013.01); *A01F 15/085* (2013.01); *A01F 2015/0808* (2013.01);
(Continued)

(58) Field of Classification Search
CPC .. A01F 15/0883; A01F 15/07; A01F 15/0705; A01F 15/085; A01F 2015/0808;
(Continued)

(56) References Cited

U.S. PATENT DOCUMENTS

| 4,770,093 A | 9/1988 | Gunther et al. |
|---|---|---|
| 6,675,561 B2 * | 1/2004 | Davis ................ A01F 15/0715 100/4 |

(Continued)

FOREIGN PATENT DOCUMENTS

| DE | 102013108246 A1 * | 2/2015 | ............. A01F 15/07 |
|---|---|---|---|
| DE | 102018208821 A1 * | 12/2019 | ......... A01F 15/0883 |

(Continued)

OTHER PUBLICATIONS

European Search Report issued in counterpart application No. 19169261.5 dated Aug. 21, 2019. (8 pages).

(Continued)

*Primary Examiner* — Arpad Fabian-Kovacs

(57) ABSTRACT

An agricultural roundbaler includes a housing having a housing part, an ejection flap pivotably mounted on the housing part about a bearing axis, and drivable pressing apparatus arranged on the housing part and the ejection flap. The pressing apparatus define a bale pressing chamber on a peripheral side thereof. A control device operably pivots the ejection flap such that an ejection opening is formed between the housing part and the ejection flap. During an unloading process, the ejection flap is adjustably pivoted by the control device from an unloading position in which the fully pressed round bale is unloaded through the ejection opening to a retained position in which the unloaded round bale is retained by the ejection flap. The ejection flap is pivotable from the retained position to a relieved position in which the retained round bale is released by the ejection flap to eject from the pressing chamber.

6 Claims, 5 Drawing Sheets

(52) U.S. Cl.
CPC ............. *F15B 19/002* (2013.01); *F15B 21/08* (2013.01); *F15B 21/082* (2013.01); *F15B 21/085* (2013.01); *F15B 21/087* (2013.01)

(58) Field of Classification Search
CPC ... B30B 9/3082; A01D 89/004; F15B 19/002; F15B 21/08; F15B 21/082; F15B 21/085; F15B 21/087
See application file for complete search history.

(56) References Cited

U.S. PATENT DOCUMENTS

| | | | | |
|---|---|---|---|---|
| 7,331,279 | B2 * | 2/2008 | Biziorek | A01F 15/07 100/48 |
| 7,353,753 | B2 | 4/2008 | Viaud | |
| 8,746,137 | B1 * | 6/2014 | Henry | A01F 15/0883 100/35 |
| 8,776,679 | B1 * | 7/2014 | Henry | A01F 15/0883 100/2 |
| 9,241,443 | B2 * | 1/2016 | Anstey | A01F 15/07 |
| 9,622,417 | B2 * | 4/2017 | Smith | A01F 15/0705 |
| 10,385,605 | B2 * | 8/2019 | Limke | A01F 15/0875 |
| 2015/0257340 | A1 | 9/2015 | Anstey et al. | |
| 2021/0088059 | A1 * | 3/2021 | Brewer | F15B 7/006 |

FOREIGN PATENT DOCUMENTS

| | | | | | |
|---|---|---|---|---|---|
| EP | 1446998 | A1 * | 8/2004 | ......... | A01F 15/0883 |
| EP | 1446998 | A1 | 8/2004 | | |
| EP | 2923560 | A1 * | 9/2015 | ............ | A01D 90/10 |
| EP | 3235368 | A1 | 10/2017 | | |
| EP | 3174380 | B1 * | 12/2018 | ........... | B30B 9/3025 |
| SU | 1759305 | A1 | 9/1992 | | |
| WO | WO-2013157951 | A1 * | 10/2013 | ......... | A01F 15/0883 |
| WO | 2014129890 | A1 | 8/2014 | | |
| WO | WO-2017058006 | A1 * | 4/2017 | ......... | A01F 15/0883 |
| WO | WO-2017201466 | A1 * | 11/2017 | ............. | A01F 15/10 |
| WO | WO-2018056805 | A1 * | 3/2018 | ......... | A01F 15/0875 |

OTHER PUBLICATIONS

Russian Search Report issued in application No. 2019108492 dated Oct. 26, 2021 (02 pages).

* cited by examiner

METHOD FOR OPERATING AN AGRICULTURAL ROUNDBALER EJECTION FLAP

RELATED APPLICATIONS

This application claims priority to German Patent Application Ser. No. 102018206518.7, filed Apr. 26, 2018, the disclosure of which is hereby incorporated by reference in its entirety.

FIELD OF THE DISCLOSURE

The present disclosure relates to an agricultural roundbaler, and in particular, to a method for operating an agricultural roundbaler.

BACKGROUND

Agricultural roundbalers are known in the art. In this case, harvested agricultural crops such as straw, grass or cereals are shaped into a round bale in a roundbaler and wrapped with a wrapping material such as, for example, net, film or binding twine. The conventional roundbaler has a pick-up and supply device for the harvested crops to be pressed, the harvested crops being introduced through the pick-up and supply device into a supply opening of a bale pressing chamber. The roundbaler includes a housing which may be configured in two parts. The housing may also be arranged on a vehicle chassis. The housing has a housing part fixed to the vehicle chassis, and an ejection flap which is pivotably mounted on the housing part about a bearing axis. In particular, a bearing on which the ejection flap may be pivotably mounted is located on the rear upper corner region of the housing part.

The bale pressing chamber comprises one or more pressing means or apparatus distributed on or at the housing part and the ejection flap, where the pressing means or apparatus defines the bale pressing chamber on the peripheral side. Thus, the housing part forms a front part of the bale pressing chamber and the ejection flap forms a rear part of the bale pressing chamber. By means of the pressing means or apparatus, a rotation-producing or rotation-maintaining engagement may be produced with a round bale located in the bale pressing chamber. The ejection flap is pivotable by means of a control device such that when opening the ejection flap, an ejection opening is able to be formed between the housing part and the ejection flap. Moreover, a dimensioning of the ejection opening is able to be altered and is adjustable by means of the control device.

At the start of the unloading process, i.e., after the end of a pressing procedure, the ejection opening is opened when the round bale is fully pressed and it has reached the desired size and may be unloaded. During the unloading process, the dimensioning of the ejection opening and the arrangement of the pressing means or apparatus, i.e., a geometry of the bale pressing chamber, is altered such that the round bale may be unloaded. In this case, in particular, the geometry between the pressing means or apparatus located directly at the ejection opening may also be altered in order to unload the round bale.

During the unloading process, there is a need for the safe unloading of the round bale on uneven or hilly terrain, since in this terrain the round bale may roll forward after being unloaded and thus may not be unloaded at the current working location. For this reason, on uneven or hilly terrain, the operator of the roundbaler initially has to interrupt the collection of the harvested crops at the current working location, search for a suitable storage location, e.g., on flat terrain, drive to the suitable storage location and unload the round bales there in order to return subsequently to the current working location again. This process is very time-consuming and requires significant effort. Moreover, the known roundbaler is not designed in terms of structure and technical systems to permit an unloading process on uneven or hilly terrain. Further, an opening of the ejection flap during the unloading process, in particular an automatic opening of the ejection flap, on uneven or hilly terrain increases the risk of accidents since the round bale may inadvertently roll forward.

SUMMARY

In the present disclosure, a roundbaler and a method for operating the roundbaler are provided which may be designed structurally and include technical systems to permit an unloading of the round bale on uneven or hilly terrain free of accidents and less time-consuming.

In one embodiment of the present disclosure, during an unloading process of the fully pressed round bale, the ejection flap of an agricultural roundbaler is adjustable by means of a control device, such that the open ejection flap is movable from an unloading position in which the fully pressed round bale is unloaded through the ejection opening into a retained position in which the unloaded round bale is retained by means of the open ejection flap. The ejection flap is movable from the retained position into a relieved position in which the retained round bale is released from the open ejection flap.

The specific design of the roundbaler and adjustability of the ejection flap during the unloading process is distinguishable over conventional roundbalers. The result of this is that the round bale which is fully pressed and unloaded through the ejection opening in the unloading position is able to be retained by means of the open ejection flap in the retained position on uneven or hilly terrain. The round bale is able to be retained by means of the open ejection flap in the retained position until the round bale no longer has any translational or kinetic energy and, in particular, is able to be deposited or stored on uneven or hilly terrain. Subsequently, the round bale is movable from the retained position into a relieved position in which the retained and resting round bale is released from the open ejection flap. Advantageously, therefore, the round bale may be retained in a simple manner and safely offloaded at the desired storage location on uneven or hilly terrain. Inadvertent rolling of the round bale after unloading may thus be prevented, such that the risk of accidents is reduced. Thus, the round bale may be offloaded directly at the working location on uneven or hilly terrain without a costly interruption to the collection process, i.e., without wasting time. In other words, the downtime of the roundbaler is significantly reduced and the unloading process is designed to be less costly. More round bales may therefore be introduced per time unit.

The roundbaler may comprise a bale pressing chamber which is not able to be altered in terms of size. In this case, the pressing means or apparatus may be configured as a pressing roller, in particular, a plurality of pressing rollers extending parallel to one another for pressing the harvested crops. The rotational axes of the pressing rollers when the ejection flap is closed may be located on a circular arc and at least one of the pressing rollers may be driven. The arrangement of the pressing rollers in the bale pressing chamber may correspond to a cylindrical shape, so that the pressing rollers are cylindrically arranged around the round bales and form a cylindrical peripheral surface. Alternatively, the roundbaler may also be configured with a bale pressing chamber which is able to be altered in terms of size or as a roundbaler with a variable bale pressing chamber, wherein the pressing means or apparatus may then be configured as a belts, bands or chain arrangements.

The unloading process may start with opening the ejection flap and finish with closing the ejection flap after unloading and retaining the fully pressed round bale. The ejection flap may be movable during the unloading process by means of the control device between the unloading position, the retained positon, and the relieved position, wherein the ejection flap is movable from the unloading position into the retained position and subsequently into the relieved position. In this case, the control device may be configured as a control motor.

In one embodiment of the invention, the ejection flap is adjustable by means of the control device such that the dimensioning of the ejection opening in the retained position is smaller than in the unloading position and the dimensioning of the ejection opening in the relieved position is larger than the dimensioning in the retained position. The dimensioning of the ejection opening may be a diameter of the ejection opening or a spacing between the housing part and the ejection flap between which the ejection opening may be formed. Since in the unloading position the fully pressed round bale is intended to be unloaded through the ejection opening, in this position the dimensioning of the ejection opening may be larger than a round bale diameter of the fully pressed round bale. In the retained position, the dimensioning of the ejection opening may be smaller than the round bale diameter since in the retained position the fully pressed and unloaded round bale is retained by the open ejection flap.

In the relieved position, the dimensioning of the ejection opening may in turn be larger than the round bale diameter since the retained round bale is released from the open ejection flap. The dimensioning of the ejection opening in the relieved position may correspond at least to the dimensioning in the unloading position. The unloading position, however, may also have a maximum dimensioning or in the relieved position a smaller dimensioning than in the unloading position. In other words, during an unloading process of the fully pressed round bale the ejection flap is adjustable by means of the control device, such that the dimensioning of the ejection opening for unloading a fully pressed round bale is initially enlarged (unloading position), the dimensioning for retaining the unloaded round bale with the open ejection flap is subsequently reduced (retained position) and the dimensioning is subsequently enlarged again for releasing the round bale (relieved position). Advantageously, therefore, the safe unloading of the round bale during the unloading process is possible on uneven or hilly terrain.

In the unloading process on uneven or hilly terrain, the unloaded round bale is prevented after unloading from being able to roll forward or topple over and unloading at the current working location is possible. Thus, on uneven or hilly terrain, the operator of the roundbaler does not have to interrupt the collection of the harvested agricultural crops at the current working location. The time taken for the unloading process and also the risk of accidents during the unloading process on uneven or hilly terrain are reduced.

In an embodiment of the invention, the ejection flap or the housing part comprises a freely rotatable retaining roller mounted directly on the ejection opening for retaining the round bale. The retaining roller may be arranged or fastened to the ejection flap or the housing part directly at the ejection opening. Due to this measure, when the ejection flap is open, in particular in the retained position, the freely rotatably mounted retaining roller retains the round bale which is unloaded from the bale pressing chamber. The unloaded round bale, however, may also slide by means of the retaining roller along the ejection flap and at the same time be retained thereby. In this case, the dimensioning of the ejection flap in the retained position may be variable, in particular, the dimensioning in the retained position, for example, from a chronological start of the retained position to a chronological end of the retained position may be increased. Thus, additional means for retaining the round bale, for example, a support roller arranged externally on the ejection flap may be dispensed with.

In another embodiment of the present disclosure, the roundbaler has an inclination sensor for measuring an inclination of the roundbaler or a communication module for receiving location information about the roundbaler. Moreover, the control device is able to be operated according to the inclination or the location information of the roundbaler. By means of the inclination sensor, the inclination may be measured, in particular, at an angle of inclination of the roundbaler relative to the vertical direction or an alteration of an angle of inclination or the angle of inclination relative to the Earth's force of gravity. The location information of the roundbaler may be the unique position of the roundbaler on the Earth's surface or in a suitable geometric reference system. The location information, for example, may be determined by means of a global positioning system (GPS) and provided or received by means of a communication module. The communication module may be a GPS device or a WLAN device or a tablet or smartphone. The inclination or the location information provide information about whether the roundbaler, in particular, the current working position of the roundbaler, is located on uneven or hilly terrain. Advantageously, therefore, the control device may be operated according to the inclination or the location information of the roundbaler, i.e., according to the current working location. Moreover, the unloading position or the retained position or the relieved position may be adjusted according to the inclination or the location information of the roundbaler. In both cases, a safe unloading of the round bale on uneven or hilly terrain may be ensured, which is achieved structurally by the provision of an inclination sensor or communication module.

The disclosure further relates to a method for operating an agricultural roundbaler comprising a housing, in particular an unloading method for a roundbaler. The housing has a housing part and an ejection flap pivotably mounted on this housing part about a bearing axis. The roundbaler further comprises a driven pressing means or apparatus distributed on the housing part and the ejection flap, where the pressing means or apparatus defines a bale pressing chamber on the peripheral side and a rotation-producing or rotation-maintaining engagement with a round bale located in the bale pressing chamber being able to be produced thereby. The ejection flap is pivoted by means of a control device such that when opening the ejection flap an ejection opening is formed between the housing part and the ejection flap and a dimensioning of the ejection opening is altered or adjusted. In this case, during an unloading process of the fully pressed round bale the ejection flap is adjusted by means of the control device such that the open ejection flap is moved from an unloading position in which the fully pressed round bale is unloaded through the ejection opening into a retained position in which the unloaded round bale is retained by means of the open ejection flap, and is moved from the retained position into a relieved position in which the retained round bale is released from the open ejection flap.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
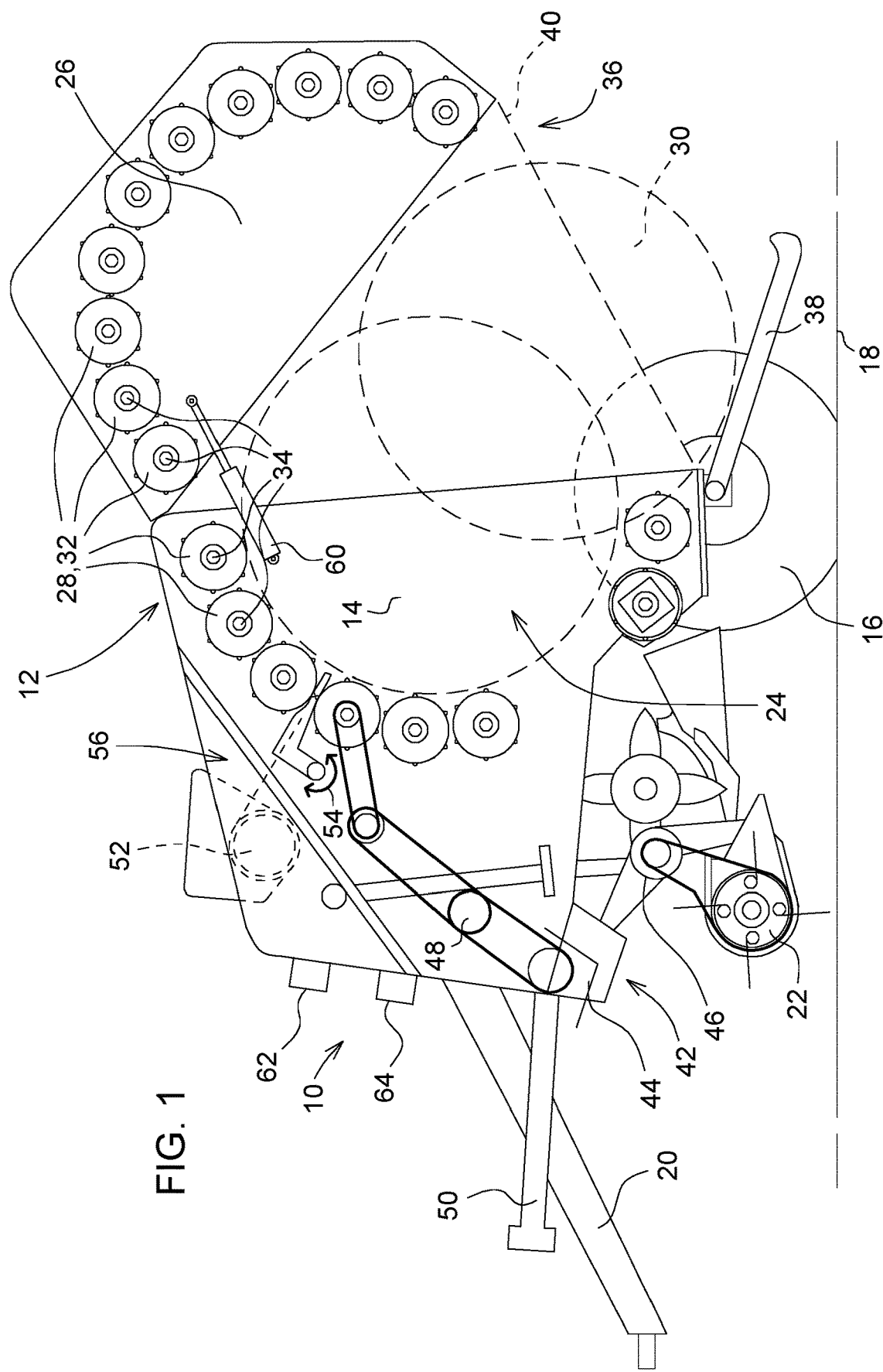
FIG. 1 is a schematic side view of a first embodiment of an agricultural roundbaler with pressing rollers and an ejection opening for unloading a pressed round bale.

In FIG. 1, a first embodiment of an agricultural roundbaler is shown. The roundbaler 10 includes a housing 12 with a housing part 14 which is supported by means of wheels 16 on the ground 18. The roundbaler 10 further includes a tow bar 20, thereby allowing the roundbaler to be attached to a tractive vehicle such as a tractor or agricultural vehicle.

In the known manner, a pick-up and supply device 22 for harvested crops is located on the front lower face of the housing part 14 in the forward direction of travel.

The housing 12 further includes an ejection flap 26 which is pivotably mounted on the housing part 14 about a bearing axis, wherein a bearing for the pivotably mounted ejection flap 26 is located specifically on the rear upper corner region of the housing part 14. Drivable pressing means or apparatus 28 are distributed on the housing part 14 and the ejection flap 26, where the pressing means or apparatus defines a bale pressing chamber 24 on the peripheral side and a rotation-producing or rotation-maintaining engagement with a round bale 30 located in the bale pressing chamber 24 being able to be produced thereby. Thus, the housing part 14 forms a front part of the bale pressing chamber 24 and the ejection flap 26 forms a rear part of the bale pressing chamber 24.

The roundbaler 10 with the bale pressing chamber 24, which is configured so as not to be able to be altered in terms of size, contains a plurality of pressing elements 28 extending parallel to one another for pressing harvested crops in the form of pressing rollers 32 (by way of example only a few pressing rollers 32 are illustrated with the reference numeral "32"), the rotational axes 34 thereof with the ejection flap 26 closed being located on a circular arc and at least some thereof being driven.

The ejection flap 26 may be actuated (opened and closed) by means of a control device 60 which may be, for example, one or more control motors. In this case, the ejection flap 26 is pivotable by means of the control device 60 such that when opening the ejection flap 26, an ejection opening 36 is able to be formed between the housing part 14 and the ejection flap 26. Through the ejection opening 36, a bale 28 pressed by the roundbaler 10 may be deposited or unloaded or ejected. In this case, the round bale 30 moves in the direction of the ejection opening 36 and rolls on a discharge or unloading ramp 38 via which the round bale 30 may be conducted onto the ground 18. Moreover, the ejection flap 26 is pivotable by means of the control device 60 such that a dimensioning 40 of the ejection opening, i.e., a diameter of the ejection opening or a spacing between the housing part 14 and the ejection flap 26, may be altered.

In another embodiment of the present disclosure, the roundbaler 10 has an inclination sensor 62 for measuring an inclination of the roundbaler 10 or a communication module 64 for receiving location information about the roundbaler 10. Moreover, the control device 60 is able to be operated according to the inclination or the location information of the roundbaler 10. By means of the inclination sensor 62, the inclination may be measured, in particular, at an angle of inclination of the roundbaler 10 relative to the vertical direction or an alteration of an angle of inclination or the angle of inclination relative to the Earth's force of gravity. The location information of the roundbaler 10 may be the unique position of the roundbaler 10 on the Earth's surface or in a suitable geometric reference system. The location information, for example, may be determined by means of a global positioning system (GPS) and provided or received by means of the communication module 64. The communication module 64 may be a GPS device or a WLAN device or a tablet or smartphone. The inclination or the location information provide information about whether the roundbaler 10, in particular, the current working position of the roundbaler 10, is located on uneven or hilly terrain. Advantageously, therefore, the control device 60 may be operated according to the inclination or the location information of the roundbaler 10, i.e., according to the current working location. Moreover, the unloading position or the retained position or the relieved position may be adjusted according to the inclination or the location information of the roundbaler 10. In both cases, a safe unloading of the round bale on uneven or hilly terrain may be ensured, which is achieved structurally by the provision of an inclination sensor 62 or communication module 64.

The roundbaler 10 further has a drive arrangement 42 with a gear arrangement 44, a first drive train 46 and a second drive train 48. A drive shaft 50 is able to be connected to a power take-off shaft (not shown) of the tractive vehicle or tractor, and serves as a drive for the drive arrangement 36. The first drive train 46, via a first output (not shown), and the second drive train 48, via a second output (not shown), of the gear arrangement 44 are drive-connected therewith. The first drive train 46 drives the pick-up and supply device 22, wherein the second drive train 48 is provided for driving the pressing means or apparatus 28 or the pressing rollers 32. The drive trains 46, 48 comprise all of the drive components which are arranged in roundbalers for driving the pick-up or supply device 22 or for driving the pressing means or apparatus 28, and on the drive side are connected to the first output or the second output of the gear arrangement 44.

Moreover, the roundbaler 10 comprises a wrapping device 56 which is provided with a roll of net or film 52 as wrapping material. The wrapping device 56 comprises a wrapping material supply device 54, which guides the wrapping material from the roll of net or film 52 into the bale pressing chamber 24. Instead of the wrapping device 56, a binding device (not shown) including binding twine may also be used in the known manner.

During a pressing process, the first and the second drive train 46, 48 are driven in parallel via the gear arrangement 44 or via the drive and the outputs, so that the pick-up and supply device 22 and the pressing means or apparatus 28, 32 are kept simultaneously in operation at a constant rotational speed ratio to one another. After the pick-up of the harvested goods and the formation of the round bale 30 by the pressing rollers 32 is completed, travel over the ground 18 is interrupted since the roundbaler 10 is filled with the round bale 30 and no further harvested crops are intended or able to be picked up in the bale pressing chamber 24. At this time, the wrapping device 56, which initiates a wrapping or binding process, is also activated. In this case, by a continuous rotation of the round bale located in the bale pressing chamber 24, the wrapping material is wrapped around the round bale 30. After a wrapping process is completed, the pressing process changes to the unloading process and the round bale is unloaded onto the ground 18 via the ejection opening and the unloading ramp 38 by opening the ejection flap 26.

As described above, one issue during the unloading process is the safe unloading of the round bale, in particular on uneven or hilly terrain, since here the terrain the round bale either rolls forward or even topples over and thus is not unloaded at the desired storage location. For this reason, on uneven or hilly terrain the operator initially has to find a suitable storage location in order to unload the round bale safely, which is very time-consuming and requires considerable effort. In order to permit the unloading process of the roundbaler 10 on uneven or hilly terrain, it is possible to adjust the ejection flap 26 during an unloading process of the fully pressed round bale 30 by means of the control device 60, such that the open ejection flap 36 is movable from an unloading position (see FIG. 2) in which the fully pressed round bale 30 is unloaded through the ejection opening 36 into a retained position in which the unloaded round bale 30 is retained by means of the open ejection flap 26 (see FIG. 3). Moreover, during the unloading process of the fully pressed round bale 30, the ejection flap 26 is adjustable by means of the control device 60 such that the open ejection flap 26 is movable from the retained position into a relieved position in which the retained round bale 30 is released from the open ejection flap 26 (see FIGS. 3 and 4). Therefore, the round bale 30 may be retained and safely offloaded at the desired storage location. Inadvertent rolling of the round bale 30 on uneven or hilly terrain may thus be prevented and the round bale 30 may be unloaded in a simple manner on uneven or hilly terrain. In other words, the downtime of the roundbaler 10 is significantly reduced and the unloading process is designed to be less costly. Thus, more round bales 30 may be introduced per time unit.

Figure 2:
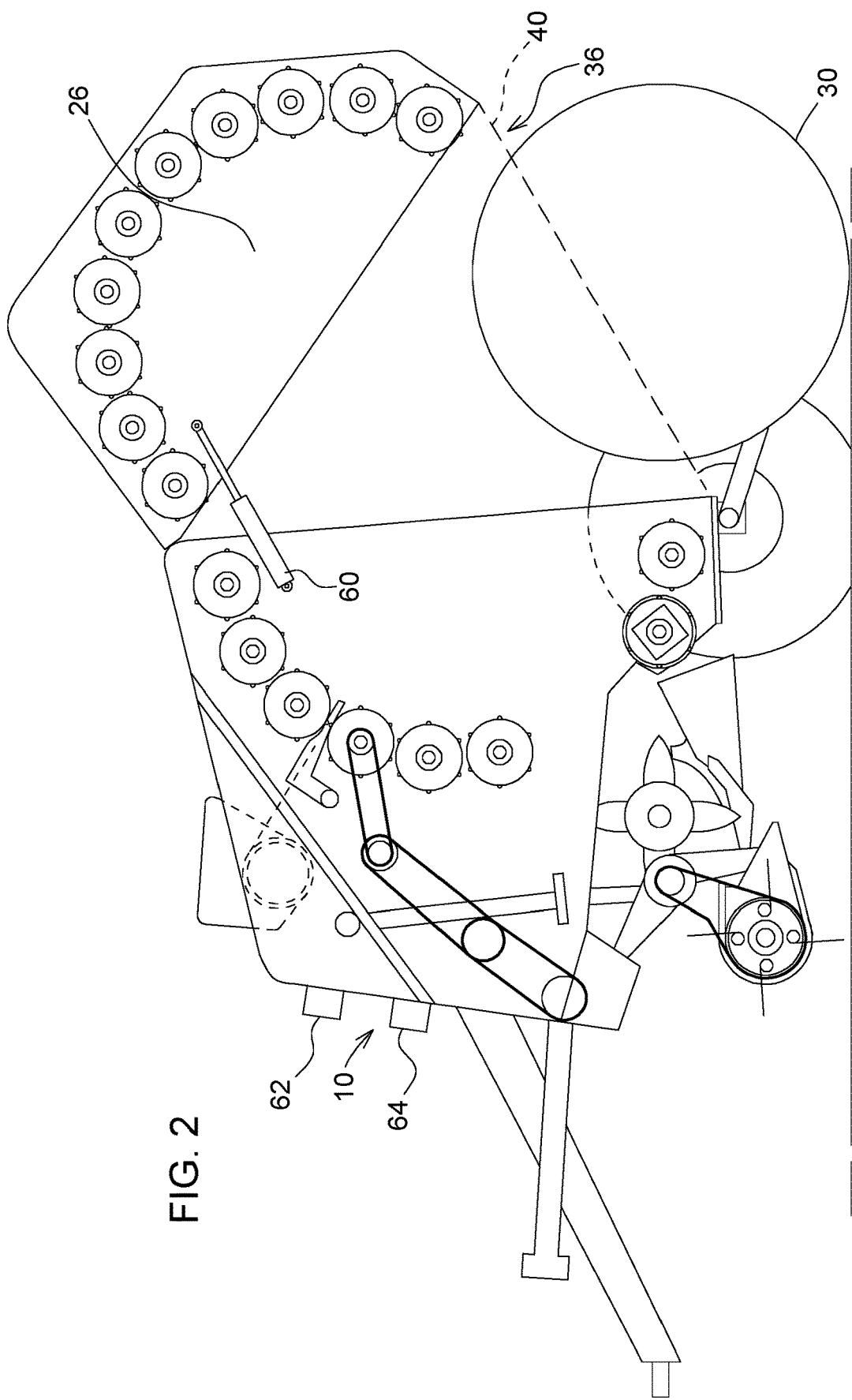
FIG. 2 is a schematic side view of the agricultural roundbaler of FIG. 1 in an unloading position.
Figure 3:
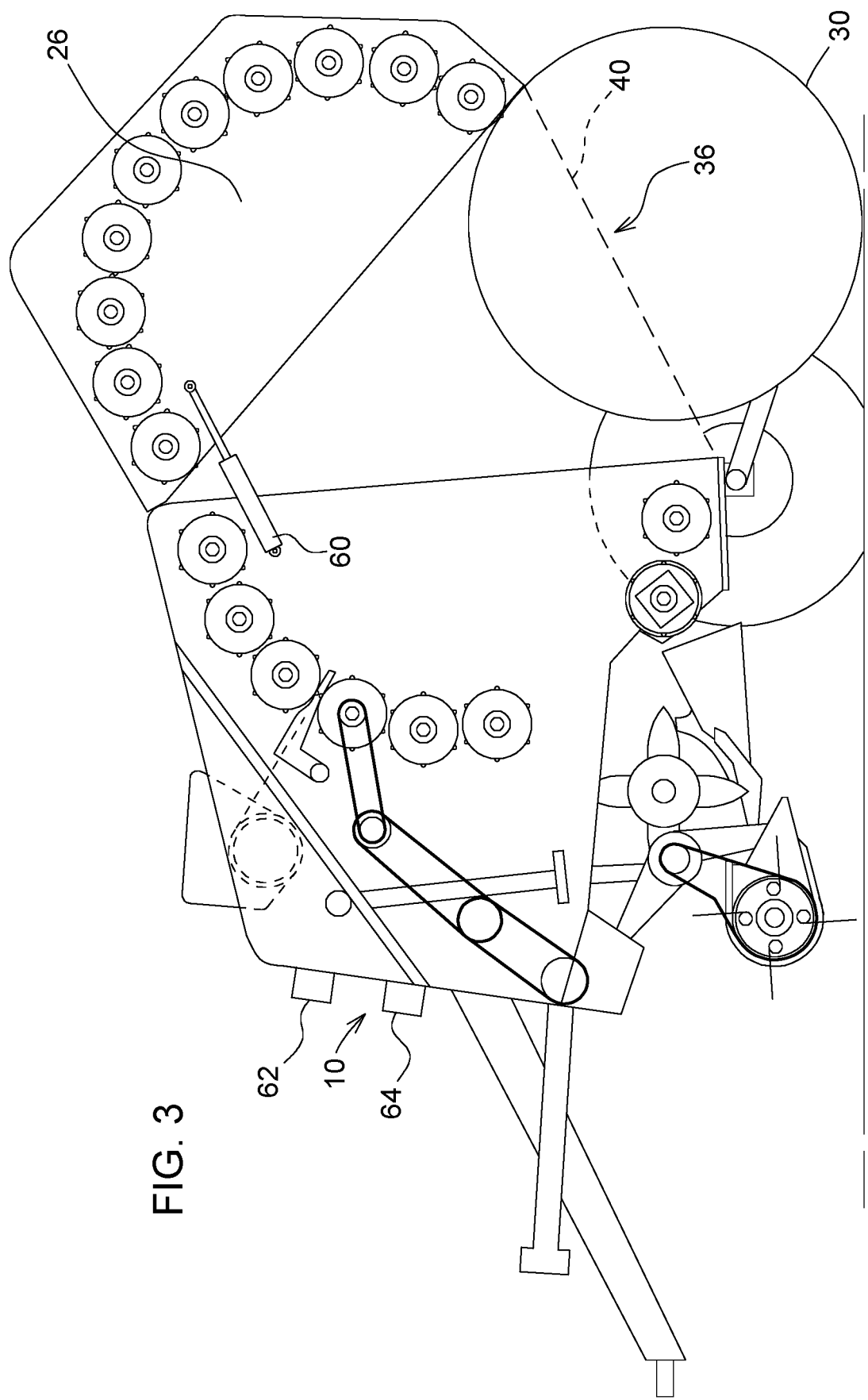
FIG. 3 is a schematic side view of the agricultural roundbaler of FIG. 1 in a retained position.
Figure 4:
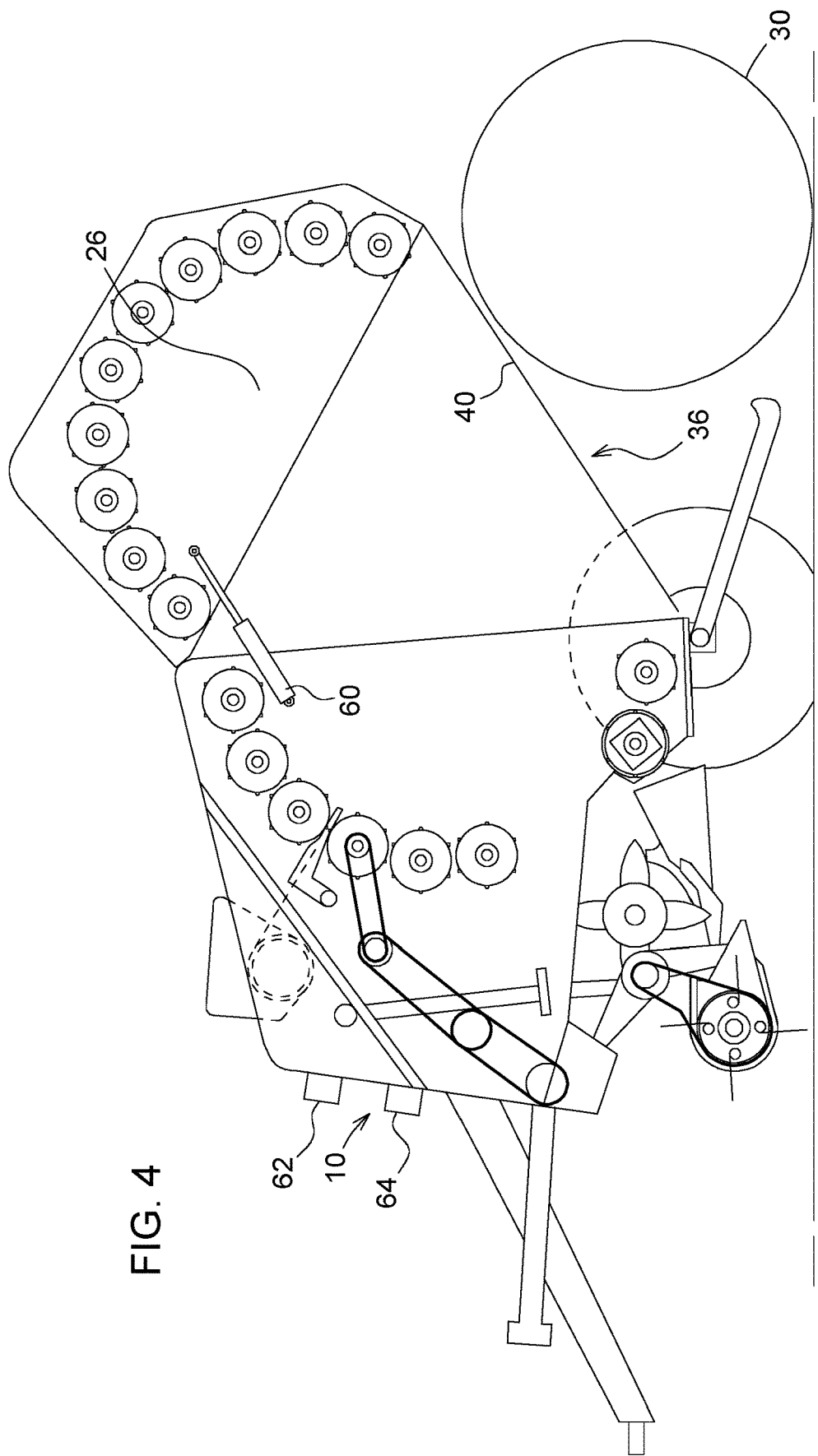
FIG. 4 is a side view of the agricultural roundbaler of FIG. 1 in a relieved position.

FIG. 2 shows a schematic side view of the agricultural roundbaler 10 according to the present disclosure in an unloading position. FIG. 3 shows a schematic side view of the agricultural roundbaler 10 in a retained position. FIG. 4 shows a schematic side view of the agricultural roundbaler 10 in a relieved position. The roundbaler 10 shown in FIGS. 2, 3 and 4 substantially corresponds to the roundbaler 10 shown in FIG. 1, so that hereinafter only the differences are described in detail.

The ejection flap 26 of the roundbaler 10 is adjustable by means of the control device 60 such that the dimensioning 40 of the ejection opening 36 in the retained position (see FIG. 3) is smaller than in the unloading position (see FIG. 2), and the dimensioning 40 of the ejection opening 36 in the relieved position (see FIG. 4) is greater than the dimensioning 40 in the retained position (see FIG. 3). In other words, during the unloading process of the fully pressed round bale 30, the ejection flap 26 is adjustable by means of the control device 60 such that when the ejection flap is open the dimensioning of the ejection opening for unloading a fully pressed round bale is initially enlarged, the dimensioning is subsequently reduced for retaining the unloaded round bale when the ejection flap is opened, and then for releasing the round bale the dimensioning is enlarged again. The roundbaler 10 is thus designed in terms of structure and technical systems such that the unloading process is able to be carried out on uneven or hilly terrain and an unloading of the round bale is possible in a less time-consuming manner.

Figure 5:
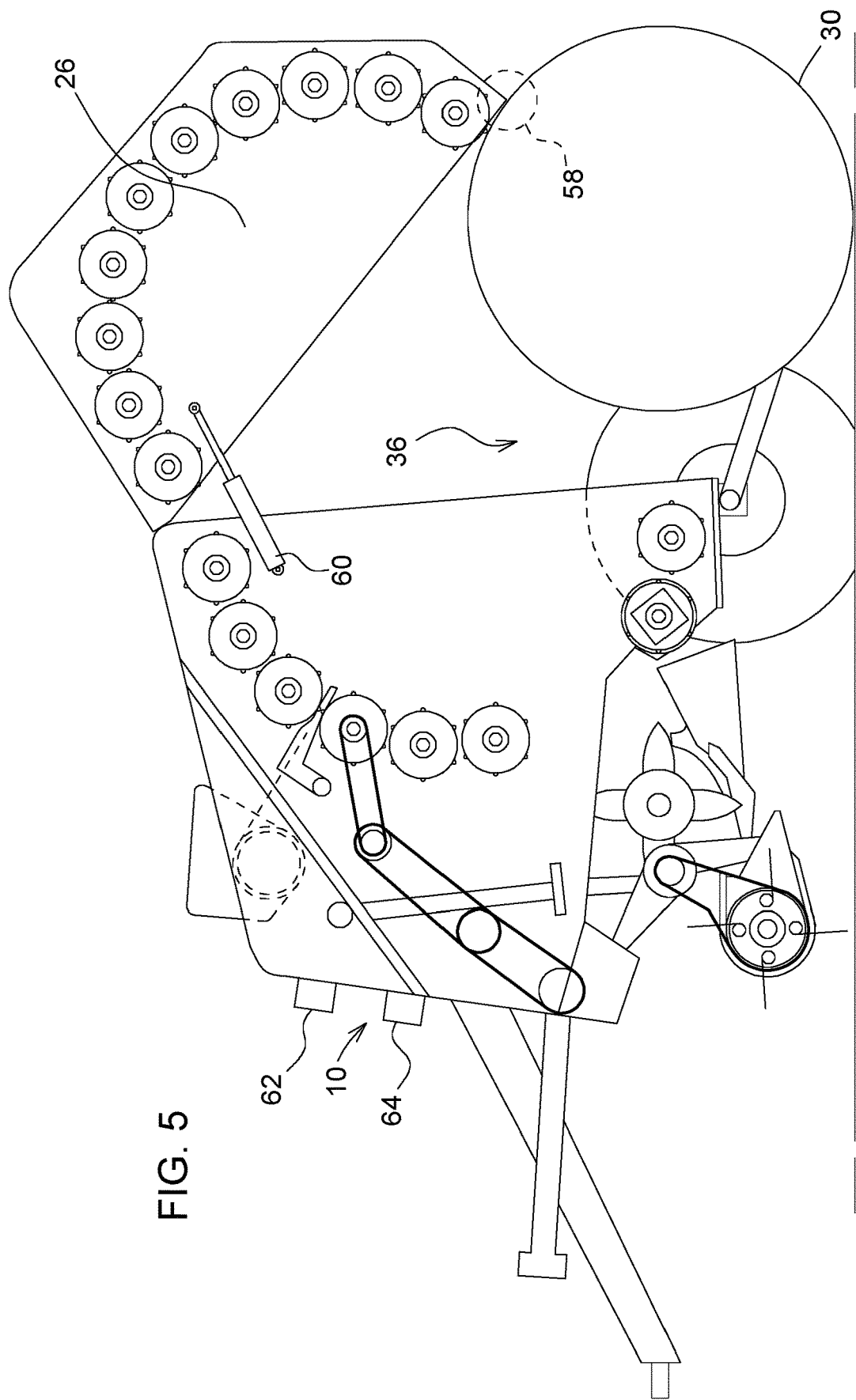
FIG. 5 is a schematic side view of a second embodiment of an agricultural roundbaler.

FIG. 5 shows a schematic side view of a second embodiment of the agricultural roundbaler 10 according to the present disclosure. The roundbaler 10 shown in FIG. 5 corresponds substantially to the roundbaler 10 shown in FIGS. 1 to 4, with the only differences being described in detail hereinafter. The ejection flap 26 comprises a freely rotatable retaining roller 58 mounted directly on the ejection opening 36 for retaining the round bale 30, wherein the freely rotatably mounted retaining roller 58 may also be arranged on the housing part 14 directly at the ejection opening 36 for retaining the round bale.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for operating an agricultural roundbaler, the method comprising:
   providing a housing having a housing part, an ejection flap pivotably mounted on the housing part for rotational movement about a bearing axis relative to the housing part, a driven pressing apparatus arranged on the housing part and the ejection flap, a bale pressing chamber for forming a round bale, and a control device for controlling movement of the ejection flap;
   forming a round bale in the bale pressing chamber with the driven pressing apparatus;
   performing an unloading process of the round bale from the bale pressing chamber;
   wherein the performing the unloading process includes moving the ejection flap into an unloading position to form an ejection opening between the housing part and the ejection flap;
   wherein the performing the unloading process includes pivoting the ejection flap with the control device from the unloading position to a retained position in which a dimension of the ejection opening is reduced such that the unloaded round bale is retained by the ejection flap until the round bale no longer has kinetic energy; and
   wherein the performing the unloading process includes pivoting the ejection flap with the control device from the retained position to a relieved position in which the dimension of the ejection opening is increased such that the round bale is released from the ejection flap onto a ground surface.

2. The method of claim 1, further comprising engaging the round bale with a freely rotatable retaining roller mounted adjacent the ejection opening when the ejection flap is disposed in the retained position.

3. The method of claim 1, further comprising measuring an inclination of the roundbaler by an inclination sensor.

4. The method of claim 3, further comprising operating the control device according to the inclination of the roundbaler.

5. The method of claim 1, further comprising detecting location information about the roundbaler by a communication module.

6. The method of claim 5, further comprising operating the control device according to the location information about the roundbaler.

\* \* \* \* \*